(12) United States Patent
Deng et al.

(10) Patent No.: US 12,279,143 B2
(45) Date of Patent: Apr. 15, 2025

(54) METHOD AND APPARATUS FOR DETERMINING POSITION OF FREQUENCY DOMAIN OF DIRECT CURRENT COMPONENT, STORAGE MEDIUM, TERMINAL, AND BASE STATION

(71) Applicant: SPREADTRUM COMMUNICATIONS (SHANGHAI) CO., LTD., Shanghai (CN)

(72) Inventors: Yun Deng, Shanghai (CN); Xinghang Gao, Shanghai (CN); Xunhua Xu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 609 days.

(21) Appl. No.: 17/510,871

(22) Filed: Oct. 26, 2021

(65) Prior Publication Data

US 2022/0053492 A1 Feb. 17, 2022

Related U.S. Application Data

(63) Continuation of application No. PCT/CN2020/079138, filed on Mar. 13, 2020.

(30) Foreign Application Priority Data

Apr. 26, 2019 (CN) .......................... 201910345212.6

(51) Int. Cl.
*H04W 24/10* (2009.01)
*H04W 72/0453* (2023.01)
(52) U.S. Cl.
CPC ....... *H04W 24/10* (2013.01); *H04W 72/0453* (2013.01)

(58) Field of Classification Search
CPC .......................... H04W 24/10; H04W 72/0453
See application file for complete search history.

(56) References Cited

U.S. PATENT DOCUMENTS

2009/0219906 A1* 9/2009 Motegi ................. H04J 13/00
370/342
2016/0374069 A1* 12/2016 Palm ..................... H04W 72/51
(Continued)

FOREIGN PATENT DOCUMENTS

| CN | 109600826 A | 4/2019 |
| WO | 2018203736 A1 | 11/2018 |
| WO | 2018235248 A1 | 12/2018 |

OTHER PUBLICATIONS

EPO Extended European Search Report corresponding to EP Application No. 20793954.7; Mailing date of Apr. 28, 2022.
(Continued)

*Primary Examiner* — Kevin C. Harper
(74) *Attorney, Agent, or Firm* — CANTOR COLBURN LLP

(57) ABSTRACT

A method and apparatus for determining a position of a frequency domain of a direct current component, a storage medium, a terminal, and a base station are provided. The method includes: receiving a transmission resource for an uplink transmission; determining an uplink signaling of the DC component, wherein the uplink signaling includes a BWP ID and a position of a frequency domain of a first DC component; and reporting the uplink signaling in the transmission resource for enabling a base station to determine whether the position of the frequency domain of the first DC component is located in uplink carrier of an UL or uplink carrier of a SUL based on the uplink signaling and a carrier determination information.

3 Claims, 3 Drawing Sheets

(56) References Cited

U.S. PATENT DOCUMENTS

2019/0313394 A1\* 10/2019 Kubota ................ H04W 72/20
2020/0008155 A1   1/2020 Li et al.
2020/0344633 A1\* 10/2020 Zhang ............... H04W 72/0453
2020/0359403 A1\* 11/2020 Lee ..................... H04W 72/21
2021/0058197 A1\* 2/2021 Gao ..................... H04L 1/1896

OTHER PUBLICATIONS

Nokia et al., "Clarification to channel bandwidth signalling", 3GPP TSG-RAN WG2 Meeting #105, R2-1902778, Feb. 25-Mar. 1, 2018; 13 pages.
3rd Generation Partnership Project et al., "Radio Resource Control (RRC) protocol specification", 3GPP TS 38.331 V15.5.1, Apr. 2019, 489 pages.
JPO Notice of Reasons for Refusal for corresponding JP Application No. 2021-563668; Mailing Date, Feb. 2, 2023.
Huawei et al., "Correction on FrequencyInfoXL and SCS-SpecificCarrier H230a-c, H232" (CR 38.331; CR version 15.2.0); 3GPP TSG-RAN WG2 Meeting 103 R2-1812687; Aug. 24, 2018; pp. 1-6.
Huawei et al., "Correction on FrequencyInfoXL and SCS-SpecificCarrier H230a-c, H232" 3GPP TSG-RAN WG2 Meeting 103 R2-1811967; Aug. 24, 2018; pp. 1-6.
International Search Report for International Application No. PCT/CN2020/079138; Date of Mailing, May 27, 2020.
NEC, "(TP for NR BL CR for TS 38.473) Tx Direct Current Location of UL BWP", 3GPP TSG-RAN3#101 R3-185207, Aug. 24, 2018; 20 pages.

\* cited by examiner

METHOD AND APPARATUS FOR DETERMINING POSITION OF FREQUENCY DOMAIN OF DIRECT CURRENT COMPONENT, STORAGE MEDIUM, TERMINAL, AND BASE STATION

CROSS-REFERENCE TO RELATED APPLICATIONS

This application is a continuation under 35 U.S.C. § 120 of PCT/CN2020/079138, filed on Mar. 13, 2020, which is incorporated herein reference and which claimed priority to Chinese Patent Application No. 201910345212.6, filed on Apr. 26, 2019. The present application likewise claims priority under 35 U.S.C. § 119 to Chinese Patent Application No. 201910345212.6, filed on Apr. 26, 2019, the entire content of which is also incorporated herein by reference.

TECHNICAL FIELD

The present disclosure generally relates to communication technology field, and more particularly, to a method and apparatus for determining position of a frequency domain of direct current component, storage medium, terminal, and base station.

BACKGROUND

The Fifth-Generation mobile communications (5G) system adopts the new radio (New Radio, NR) technology with large bandwidth and high rate, and introduces a new concept "Band Width Part (BWP)", allowing a NR UE uses a narrowband BWP to access the 5G system to transmit service with the broadband BWP.

For a serving cell, a base station may configure a plurality of BWPs (such as 4 BWPs) for a UE, but only one BWP at most in Release 15 is activated, that is, the UE can only receive Downlink Control Information (DCI) of the base station by the active BWP, and send and receive data by the active BWP.

However, in the conventional technology, when a base station requests a UE to report a position of a frequency domain of an uplink DC component, if an UL and a SUL is configured in the base station in a serving cell, it is difficult for the base station to determine whether the position of the frequency domain of the DC component is in the UL or the SUL after receiving the position of the frequency domain of the DC component, which is liable to cause a DC component reception error.

SUMMARY

Embodiments in the present disclosure provide a method and device for determining a position of a frequency domain of a direct current (DC) component, a storage medium, a terminal and a base station, so that a base station may determine whether the position of the frequency domain of the DC component is located in uplink carrier of an UL or uplink carrier of a SUL, thereby improving an accuracy of receiving a position of a frequency domain of a DC component.

In an embodiment of the present disclosure, a method for determining a position of a frequency domain of a Direct Current (DC) component is provided, including: receiving a transmission resource for an uplink transmission; determining an uplink signaling of the DC component, wherein the uplink signaling includes a BWP ID and a position of a frequency domain of a first DC component; and reporting the uplink signaling in the transmission resource for enabling a base station to determine whether the position of the frequency domain of the first DC component is located in uplink carrier of an UL or uplink carrier of a SUL based on the uplink signaling and a carrier determination information.

In an embodiment of the present disclosure, a device for determining a position of the frequency domain of a Direct Current (DC) component is provided, includes: a circuitry for receiving transmission resource, adapted to receive a transmission resource for an uplink transmission; a circuitry for determining uplink signaling, adapted to determine an uplink signaling of the DC component, wherein the uplink signaling includes a BWP ID and a position of a frequency domain of a first DC component; and a circuitry for reporting uplink signaling, adapted to report the uplink signaling in the transmission resource for enabling a base station to determine whether the position of the frequency domain of the first DC component is located in uplink carrier of an UL or uplink carrier of a SUL based on the uplink signaling and a carrier determination information.

In an embodiment of the present disclosure, a non-transitory storage medium storing one or more programs, the one or more programs comprising computer instructions, when executed by a processor, cause the processor to: receiving a transmission resource for an uplink transmission; determining an uplink signaling of the DC component, wherein the uplink signaling includes a BWP ID and a position of a frequency domain of a first DC component; and reporting the uplink signaling in the transmission resource for enabling a base station to determine whether the position of the frequency domain of the first DC component is located in uplink carrier of an UL or uplink carrier of a SUL based on the uplink signaling and a carrier determination information.

DETAILED DESCRIPTION

In a 5G system, a maximum bandwidth of a cell can reach 400 MHz, which far exceeds a maximum cell bandwidth of 20 MHz specified in the Long Term Evaluation (LTE) technology. If all NR UEs need to access a 400 MHz bandwidth when accessing a network, it will greatly increase cost and power consumption of UEs. Therefore, a new concept "Band Width Part (BWP)" is introduced in the 5G system, allowing a NR UE to use a narrowband BWP to access the 5G system to transmit services with the broadband BWP.

For one serving cell, a base station may configure a plurality of BWPs (for example, 4 BWPs) for a UE. Take a cell including 4 BWPs as an example. The 4 BWPs may include a BWP0, a BWP1, a BWP2 and a BWP3. Among them, an initial BWP is the BWP0, a UE in an idle state can reside on the BWP0, and a base station sends a System Information (SI), a paging message, etc. on the BWP0. The system message includes a Master Information Block (MIB for short), a System Information Block 1 (SIB1), a System Information Block 2 (SIB2), and the like. Due to differences in the importance of system messages, some need to be broadcast periodically (for example, MIB and SIB1), and some System Information Block (SIB) can be transmitted by the NR base station in different transmission modes depending on actual load conditions, can be broadcast periodically or can be transmitted non-periodically based on a request of a UE.

A MIB is transmitted in an initial BWP (for example, BWP0) by a base station, and configuration information of public search space can be obtained by a UE according to configuration information in the MIB. DCI related to a system message can be detected by the UE by the public search space, and the DCI is scrambled by a System Information-Radio Network Temporary Identifier (SI-RNTI for short). After the DCI scrambled by the SI-RNTI is decoded by the UE, the UE can receive a related system message by a specified Physical Downlink Shared Channel (PDSCH). For example, a SIB1, a SIB2 and the like are all transmitted by a PDSCH.

Further, a UE can access the cell by an initial BWP (that is, BWP0), or access the cell by a handover. Assume that the cell is configured with 4 BWPs (for example, a BWP0, a BWP1, a BWP2, and a BWP3) for the UE. Configuration information of the above four BWPs can be notified to the UE by a RRC signaling by a base station, for example, a bandwidth, a position of a frequency domain, etc. Moreover, a SUL is configured for the cell by the base station, and the SUL can contain the same or different numbers of BWPs.

However, at most one BWP in Release 15 is an activated BWP, that is, a UE can only receive a Downlink Control Information (DCI) of a base station by the activated BWP, and send and receive data by the activated BWP.

Figure 1:
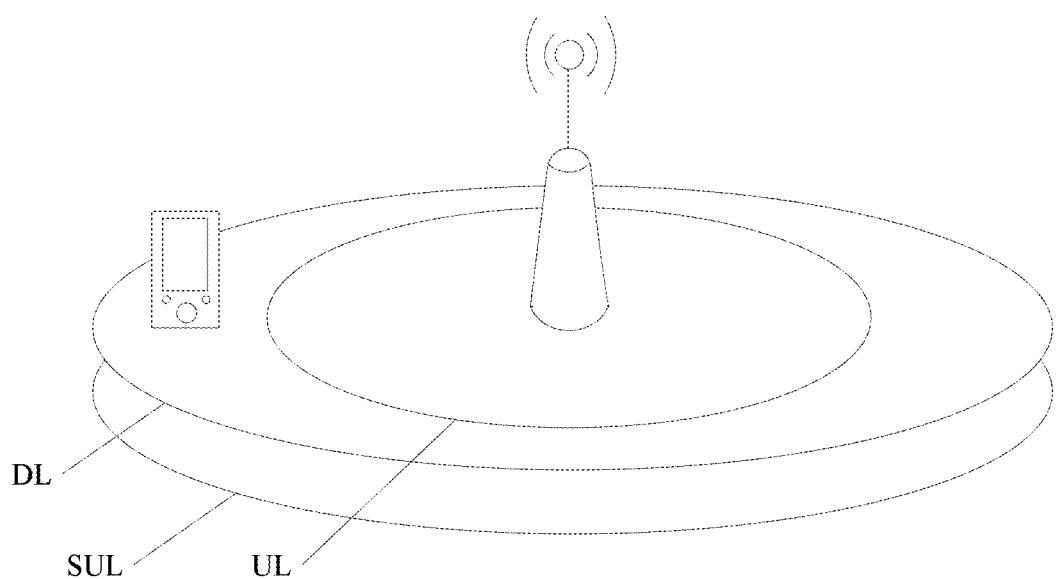
FIG. 1 is a schematic diagram of a working scenario based on a supplementary uplink carrier in the conventional technology.

Referring to FIG. 1, FIG. 1 is a schematic diagram of a working scenario based on a supplementary uplink carrier in the conventional technology.

As shown in FIG. 1, in order to improve network coverage, a serving cell can be configured with a Supplementary Uplink (SUL), a SUL is usually located at a low frequency and can provide a large coverage. For example, a coverage of a SUL is similar to a coverage of a Downlink (DL), while an uplink (UL) is located at a higher frequency and has a smaller coverage.

For some UEs, a base station can schedule the UE for uplink transmission in an UL or a SUL respectively by a dynamic signaling, and there is an Information Element in the dynamic signaling to indicate whether or not to use a SUL for the uplink transmission. For other UEs, a base station can configure the UE to transmit in which uplink carrier by Radio Resource Control (RRC).

A base station needs to know specific positions of frequency domains of DC components on different BWPs of a UE in a serving cell, so as to use the received DC components for scheduling resource or to determine a time delay for a UE to switch a BWP.

Inventors of the present disclosure has discovered by research that when a UE is requested by a base station to report a position of a frequency domain of an uplink DC component, if an UL and a SUL are configured by the base station in a serving cell, an existing uplink signaling format does not support that the UE explicitly indicates a DC component of each BWP in the UL and the SUL, the base station cannot distinguish from an uplink signaling sent by the UE whether the position of the frequency domain of a DC component reported by the UE is located in the UL or the SUL, which may easily lead to errors in a reception of a DC component.

In some embodiment of the present disclosure, a transmission resource for an uplink transmission is received; an uplink signaling of a DC component is determined, wherein the uplink signaling includes a BWP Identity (ID) and a position of a frequency domain of a first DC component; and the uplink signaling is reported in the transmission resource for enabling a base station to determine whether the position of the frequency domain of the first DC component is located in uplink carrier of an UL or uplink carrier of a SUL based on the uplink signaling and a carrier determination information. With the above method, by setting the carrier determination information, the base station can determine whether the position of the frequency domain of the first DC component is located in uplink carrier of the UL or uplink carrier of the SUL based on the uplink signaling and the carrier determination information. In conventional technology, a base station cannot distinguish from an uplink signaling sent by a UE whether a position of a frequency domain of a DC component reported by the UE is in an UL or a SUL, which is liable to lead to an error in determining a DC component. Compared with the conventional technology, the present disclosure enables a base station to determine whether a position of a frequency domain of the first DC component is located in uplink carrier of an UL or uplink carrier of a SUL, thereby improving an accuracy of determining a position of a frequency domain of a DC component.

It should be noted that a position of a frequency domain of a DC component of each BWP is reported by a UE based on each serving cell and a BWP of each serving cell, that is, a position of a frequency domain of a DC component of an UL or a SUL reported by an uplink signaling is a position in a frequency domain where a DC component of each BWP of an UL or a SUL is located in. In an uplink signaling, a BWP ID is used to indicate which BWP a position of a frequency domain of a reported DC component belongs to. In addition, in some embodiments, an UL and a SUL refer to two uplink carriers configured in a same serving cell. In practice, each serving cell can be configured with none, one, or two uplink carriers (i.e., an UL and a SUL). Embodiments of the present disclosure provide a scenario where two uplink carriers are configured for one serving cell.

In order to clarify the object, characteristic and advantages of embodiments of the present disclosure, the embodiments of present disclosure will be described clearly in detail in conjunction with accompanying drawings.

Figure 2:
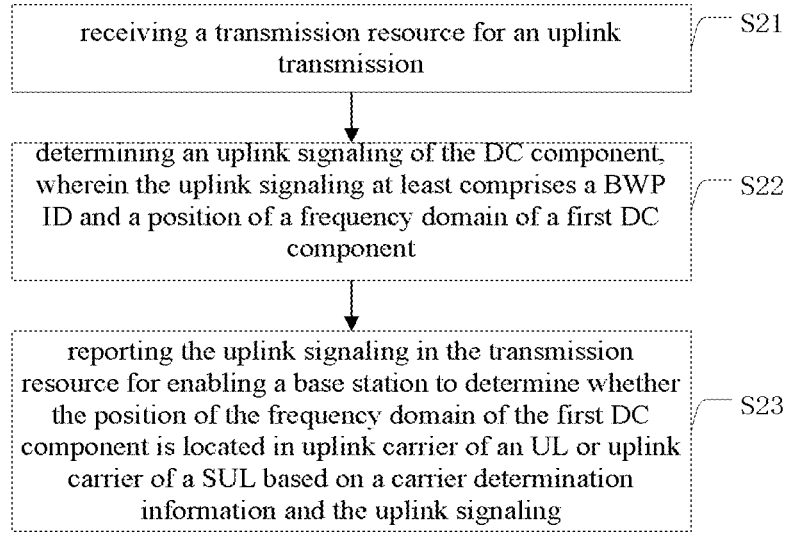
FIG. 2 is a flowchart of a method for determining a position of a frequency domain of a DC component in an embodiment of the present disclosure.

Referring to FIG. 2, FIG. 2 is a flowchart of a method for determining a position of a frequency domain of a DC component in an embodiment of the present disclosure. The method for determining a position of a frequency domain of a DC component may be used at a UE side, and may include S21, S22 and S23.

In S21, receiving a transmission resource for an uplink transmission.

In S22, determining an uplink signaling of the DC component, wherein the uplink signaling at least includes a BWP ID and a position of a frequency domain of a first DC component.

In S23, reporting the uplink signaling in the transmission resource for enabling a base station to determine whether the position of the frequency domain of the first DC component is located in uplink carrier of an UL or uplink carrier of a SUL based on a carrier determination information and the uplink signaling.

In the specific implementation of S21, a UE receives a transmission resource for an uplink transmission from a base station, and then the UE reports an uplink signaling in subsequent process.

Specifically, in a specific example of the present disclosure, a base station may schedule which uplink carrier a UE performs an uplink transmission on by a dynamic signaling, and a dynamic signaling contains an Information Element to indicate whether a SUL can be used for an uplink transmission.

In another specific example of embodiments of the present disclosure, it may be configured by a base station which uplink carrier a UE performs an uplink transmission on by a Radio Resource Control (RRC).

It can be seen from above that it can be determined whether a transmission resource is located in an UL or a SUL, so a base station can accurately obtain an uplink signaling reported by a UE using a transmission resource.

In a specific implementation of S22, a UE determines an uplink signaling of a DC component.

Specifically, the uplink signaling is configured to indicate a determination related information of a position of a frequency domain of a DC component for enabling a base station to receive the position of the frequency domain of the DC component reported by the UE.

Specifically, the uplink signaling includes a BWP ID, a position of a frequency domain of a first DC component, and usually also includes an offset indication information.

Wherein, the BWP ID may be configured to indicate a sequence number or an identifier of a bandwidth part, the position of the frequency domain of the first DC component is configured to enable a base station to determine a position of a frequency domain of a DC component during an uplink transmission of a UE, and the offset indication information is configured to indicate whether there is an offset, and in some embodiment, the offset is 7.5 kHz.

In a specific implementation of S23, a UE reports an uplink signaling in a transmission resource for enabling a base station to determine whether a position of a frequency domain of a first DC component is located in uplink carrier of an UL or uplink carrier of a SUL based on the uplink signaling and a carrier determination information.

Wherein, the transmission resource may be located in an uplink carrier which is currently allowed to transmit data in a PUSCH. A UE can support a carrier aggregation. In this situation, a UE is configured with a plurality of serving cells, and the UE needs to report a position of a frequency domain (and offset) of a DC component in each BWP in each cell based on different serving cells. Among the plurality of serving cells, one is a primary cell, and the UE transmits an uplink signaling in an UL or a SUL of this cell; the other serving cells are auxiliary cells, and the uplink signaling (RRC signaling) usually cannot be reported by the auxiliary cells to a base station. A carrier determination information may be an uplink carrier currently allowed for a data transmission in a PUSCH. For a primary cell, a base station can know that a position of a frequency domain of a first DC component of the primary cell (each BWP) is located in an uplink carrier (an uplink carrier of a primary cell) carrying the uplink signaling based on a received uplink signaling, that is, a position of a frequency domain of a first DC component of the primary cell is located in an uplink carrier currently allowed to transmit data in a PUSCH; for an auxiliary cell, a base station can know a position of a frequency domain of a first DC component of the auxiliary cell (each BWP) is located in an uplink carrier (an uplink carrier of an auxiliary cell) currently allowed for data transmission in a PUSCH.

In a conventional technology, it is difficult for a base station to determine whether a position of a frequency domain of a first DC component is located in uplink carrier of an UL or uplink carrier of a SUL, which is liable to lead to a problem of failure in acquiring. In an embodiment of the present invention, by determining a carrier determination information, a base station can determine whether a position of a frequency domain of a first DC component is located in uplink carrier of an UL or uplink carrier of a SUL based on an uplink signaling and the carrier determination information.

Further, in a specific application in the embodiment of the present disclosure, a carrier determination information may include that a position of a frequency domain of a first DC component is located in an UL. That is, by a preset setting, the position of the frequency domain of the first DC component is fixed at a position of a frequency domain of a DC component on a BWP of an uplink carrier of a UE, thereby avoiding a wrong determination of a position of a frequency domain of a DC component by the base station.

Specifically, a carrier determination information may be an explicit indication information or an implicit indication information.

In a first specific implementation of the present disclosure, a carrier determination information may include a first Information Element, and the first Information Element is included in an uplink signaling, that is, when a base station receives the uplink signaling, the first Information Element can be obtained by the base station.

In some embodiment, the first Information Element may be one bit. By one bit, it means that a position of a frequency domain of a first DC component is located in an UL, that is, a position of a frequency domain of a DC of a UE in a BWP of an uplink carrier is in the UL. When the value of the bit is set to 0, it means that the position of the frequency domain of the first DC component is located in a SUL. In a specific implementation, a setting may also be configured on the opposite, that is, the value of the bit of the first Information Element being 0 means that the position of the frequency domain of the first DC component is located in a SUL.

In the LTE, a UE may only report one DC component, in a 5G technology, there may be a case that two DC components are reported. It can be understood that in the conventional 5G technology, a UE does not inform a base station whether a position of a frequency domain of a first DC component is located in uplink carrier of an UL or uplink carrier of a SUL, when positions of frequency domains of two DC components are reported, the base station is more liable to lead to an error in receiving the positions of the frequency domains of the two DC components.

In a second specific implementation of the present disclosure, an uplink signaling further includes a position of a frequency domain of a second DC component. Reporting the uplink signaling in a transmission resource, so that a base station determines whether a position of a frequency domain of a first DC component is located in uplink carrier of an UL or uplink carrier of a SUL based on the uplink signaling and a carrier determination information may include: reporting the uplink signaling in the transmission resource for enabling the base station to determine that the position of the frequency domain of the first DC component is located in an uplink carrier indicated by a first Information Element and the position of the frequency domain of the second DC component is located in an uplink carrier other than the uplink carrier indicated by the first Information Element.

Specifically, the carrier determination information includes the first Information Element. Assuming that the first Information Element indicates an UL, a UE by the first Information Element indicates an uplink carrier corresponding to the position of the frequency domain of the first DC component is an UL and an uplink carrier corresponding to the position of the frequency domain of the second DC component is a SUL.

In a third specific implementation of the present disclosure, a carrier determination information further includes a second Information Element, the second Information Element is included in an uplink signaling, and the uplink signaling further includes a position of a frequency domain of a second DC component. Reporting the uplink signaling in a transmission resource for enabling a base station to determine whether a position of a frequency domain of a first DC component is located in uplink carrier of an UL or uplink carrier of a SUL based on the uplink signaling and the carrier determination information includes: reporting the uplink signaling in the transmission resource for determine the base station to determine that the position of the frequency domain of the first DC component is located in an uplink carrier indicated by a first Information Element and the position of the frequency domain of the second DC component is located in an uplink carrier indicated by the second Information Element. Wherein, the second Information Element is configured to indicate whether the position of the frequency domain of the second DC component is located in the UL or the SUL.

In an embodiment of the present disclosure, by setting a first Information Element, or setting a first Information Element and a second Information Element, it can be explicitly indicated that which carrier of an UL and a SUL two positions of frequency domains are located in respectively, so that when a UE reports the positions of frequency domains of two DC components, the two positions of frequency domains can still be correctly received by a base station.

In a fourth specific implementation of the present disclosure, an uplink signaling further includes a position of a frequency domain of a second DC component, a carrier determination information includes a mapping relationship between a position of a frequency domain of a first DC component and a predefined uplink carrier. Reporting the uplink signaling in a transmission resource for enabling a base station to determine whether the position of the frequency domain of the first DC component is located in uplink carrier of an UL or uplink carrier of a SUL based on the uplink signaling and the carrier determination information includes: reporting the uplink signaling in the transmission resource for enabling the base station to determine that the position of the frequency domain of the first DC component is located in the predefined uplink carrier and the position of the frequency domain of the second DC component is located in an uplink carrier other than the predefined uplink carrier.

Specifically, the carrier determination information includes a mapping relationship between the position of the frequency domain of the first DC component and the predefined uplink carrier, which means that an UL or a SUL for a first DC component can be specified in advance. Taking the carrier determination information that the position of the frequency domain of the first DC component is mapped to the UL as an example, after the transmission resource reports the uplink signaling, the base station can determine the frequency of the first DC component is in the UL.

Specifically, taking the carrier determination information that the position of the frequency domain of the first DC component is mapped to an UL as an example, when there are two DC components, the base station can determine that the position of the frequency domain of the second DC component is located in a SUL.

In an embodiment of the present disclosure, the carrier determination information includes a mapping relationship between a position of a frequency domain of a first DC component and a predefined uplink carrier. With an implicit indication, that is, which one of an UL and a SUL is pre-defined to be used for a first DC component, so that when a UE reports a position of a frequency domain of one DC component or positions of frequency domains of two DC components, the one or two positions of frequency domains can be correctly received by the base station.

In a fifth specific implementation of the present disclosure, an uplink signaling further includes a position of a frequency domain of a second DC component, a carrier determination information includes a mapping relationship between a position of a frequency domain of a first DC component and an uplink carrier configured with a Physical Uplink Shared Channel (PUSCH). Reporting the uplink signaling in a transmission resource for enabling a base station to determine that whether the position of the frequency domain of the first DC component is located in uplink carrier of an UL or uplink carrier of a SUL based on the uplink signaling and the carrier determination information includes: reporting the uplink signaling in the transmission resource for enabling the base station to determine that the position of the frequency domain of the first DC component is located in the uplink carrier currently allowed to transmit data in the PUSCH and the position of the frequency domain of the second DC component is located in an uplink carrier other than the uplink carrier currently allowed to transmit data in the PUSCH.

Specifically, the carrier determination information includes a mapping relationship between the position of the frequency domain of the first DC component and the uplink carrier configured with the PUSCH, which means that it can be pre-defined that the position of the frequency domain of the first DC component is located in the uplink carrier configured with a PUSCH (an uplink carrier which is currently allowed for an uplink transmission in a PUSCH), or it can be pre-defined that the position of the frequency domain of the first DC component is not located in the uplink carrier configured with the PUSCH, that is, the position of the frequency domain of the second DC component is located in the uplink carrier configured with the PUSCH.

Assuming that a carrier determination information is an uplink carrier configured with a PUSCH, such as an UL, after a transmission resource reports an uplink signaling, the base station may determine that a position of a frequency domain of a first DC component is in the UL.

Specifically, taking the carrier determination information being an UL configured with the PUSCH as an example, when there are two DC components, a base station can determine that the position of the frequency domain of the first DC component is located in an UL configured with the PUSCH, and that the position of the frequency domain of the second DC component is located in a SUL.

In an embodiment of the present disclosure, a carrier determination information includes a mapping relationship between a position of a frequency domain of a first DC component and an uplink carrier configured with a PUSCH. With an implicit indication, that is, the position of the frequency domain of the first DC component is pre-defined in an uplink carrier configured with the PUSCH or in an uplink carrier other than the uplink carrier configured with the PUSCH. When a UE reports a position of a frequency domain of one DC component or positions of frequency domains of two DC components, the one or two positions of frequency domains can be correctly received by the base station.

In a sixth specific implementation of the present disclosure, an uplink signaling further includes a position of a frequency domain of a second DC component, a carrier determination information includes a mapping relationship between a position of a frequency domain of a first DC component and an uplink carrier configured with a PUCCH. Reporting the uplink signaling in a transmission resource for enabling a base station to determine that whether the position of the frequency domain of the first DC component is located in uplink carrier of an UL or uplink carrier of a SUL based on the uplink signaling and the carrier determination information includes: reporting the uplink signaling in the transmission resource for enabling a base station to determine that the position of the frequency domain of the first DC component is located in an uplink carrier same as the uplink carrier configured with the PUCCH and the position of the frequency domain of the second DC component is located in an uplink carrier other than the uplink carrier configured with the PUCCH.

Specifically, the carrier determination information includes a mapping relationship between the position of the frequency domain of the first DC component and the uplink carrier configured with the PUCCH, which means that it can be pre-defined that a position of a frequency domain of a first DC component is located in an uplink carrier configured with the PUCCH, or it can be pre-defined that a position of a frequency domain of a first DC component is not located in an uplink carrier configured with the PUCCH.

Assuming that a carrier determination information is that a position of a frequency domain of a first DC component is located in an uplink carrier configured with a PUCCH, such as an UL, after a transmission resource reports an uplink signaling, the base station may determine that a position of a frequency domain of a first DC component is in the UL.

Specifically, taking the carrier determination information that the position of the frequency domain of the first DC component is located in an uplink carrier UL configured with the PUCCH as an example, when there are two DC components reported, a base station can determine that the position of the frequency domain of the second DC component is located in a SUL.

In an embodiment of the present disclosure, a carrier determination information includes a mapping relationship between a position of a frequency domain of a first DC component and an uplink carrier configured with a PUCCH. With an implicit indication, that is, the position of the frequency domain of the first DC component is pre-defined in an uplink carrier same as an uplink carrier configured with the PUCCH, or the position of the frequency domain of the first DC component is pre-defined in an uplink carrier other than the uplink carrier configured with the PUCCH. When a UE reports a position of a frequency domain of one DC component or positions of frequency domains of two DC components, the one or two positions of frequency domains can be correctly received by the base station.

In an embodiment of the present disclosure, by setting the carrier determination information, a base station at least determines whether a position of a frequency domain of a first DC component is located in uplink carrier of an UL or uplink carrier of a SUL based on an uplink signaling and the carrier determination information. In a conventional technology, a base station cannot distinguish from an uplink signaling sent by a UE whether a position of a frequency domain of a DC component reported by the UE is in an UL or SUL (in each BWP), which is liable to lead to an error in determining a DC component. Compared with the conventional technology, the disclosure enable a base station to determine whether a position of a frequency domain of a first DC component is located in uplink carrier of an UL or uplink carrier of a SUL, thereby improving an accuracy of receiving a position of a frequency domain of a DC component.

Figure 3:
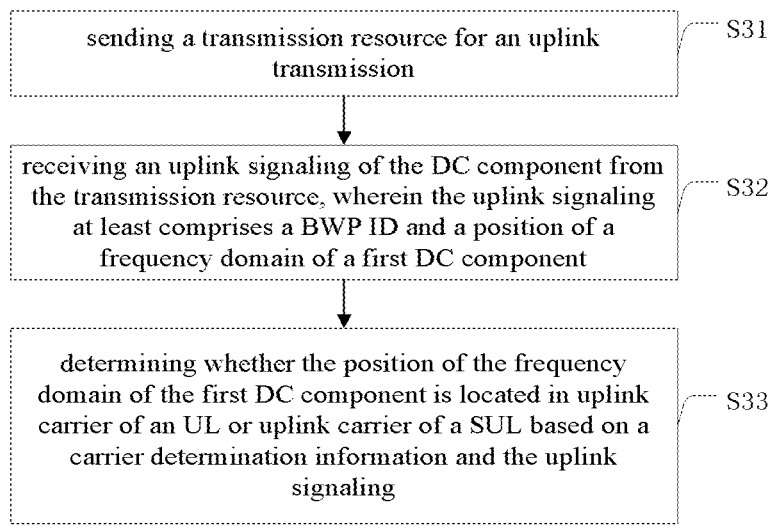
FIG. 3 is a flowchart of another method for determining a position of a frequency domain of a DC component in an embodiment of the present disclosure.

Referring to FIG. 3, FIG. 3 is a flowchart of another method for determining a position of a frequency domain of a DC component in an embodiment of the present disclosure. The method for determining a position of a frequency domain of a DC component may be used on a base station, and may include S31, S32 and S33.

In S31, sending a transmission resource for an uplink transmission.

In S32, receiving an uplink signaling of the DC component from the transmission resource, wherein the uplink signaling at least comprises a BWP ID and a position of a frequency domain of a first DC component.

In S33, determining whether the position of the frequency domain of the first DC component is located in uplink carrier of an UL or uplink carrier of a SUL based on a carrier determination information and the uplink signaling.

It should be noted that an UL and a SUL refer to two uplink carriers of a same serving cell.

In a seventh specific implementation of the present disclosure, a carrier determination information includes a first Information Element, and the first Information Element is included in an uplink signaling. Wherein, the first Information Element is configured to indicate whether the position of the frequency domain of the first DC component is located in an UL or a SUL.

Principles, detailed operation and benefits of the seventh specific implementation can be found in above descriptions of the first specific implementation for determining a position of a frequency domain of a DC component shown in FIG. 2, and thus are not described hereinafter.

In an eighth specific implementation of the present disclosure, an uplink signaling further includes a position of a frequency domain of a second DC component. Determining at least whether a position of a frequency domain of a first DC component is located in uplink carrier of an UL or uplink carrier of a SUL based on the uplink signaling and a carrier determination information includes: determining at least the position of the frequency domain of the first DC component is located in an uplink carrier indicated by a first Information Element, and determining the position of the frequency domain of the second DC component is located in an uplink carrier other than the uplink carrier indicated by the first Information Element.

Principles, detailed operation and benefits of the eighth specific implementation can be found in the above descriptions of the second specific implementation for determining a position of a frequency domain of a DC component shown in FIG. 2, and thus are not described hereinafter.

In a ninth specific implementation of the present disclosure, a carrier determination information includes a second Information Element, the second Information Element is included in an uplink signaling, and the uplink signaling further includes a position of a frequency domain of a second DC component. Determining whether a position of a frequency domain of a first DC component is located in uplink carrier of an UL or uplink carrier of a SUL based on the uplink signaling and the carrier determination information includes: determining at least the position of the frequency domain of the first DC component is located in an uplink carrier indicated by a first Information Element and the position of the frequency domain of the second DC component is located in an uplink carrier indicated by the second Information Element. Wherein, the second Information Element is configured to indicate whether the position of the frequency domain of the second DC component is located in the UL or the SUL.

Principles, detailed operation and benefits of the ninth specific implementation can be found in the above descriptions of the third specific implementation of a method for determining a position of a frequency domain of a DC component shown in FIG. 2, and thus are not described hereinafter.

In an embodiment of the present disclosure, by setting a first Information Element and a second Information Element, it can be explicitly indicated that which carrier of an UL or a SUL two positions of frequency domains are located in respectively. When a UE reports positions of frequency domains of two DC components, the two positions of frequency domains can still be correctly received and analyzed by a base station.

In a tenth specific implementation of the present disclosure, an uplink signaling further includes a position of a frequency domain of a second DC component, a carrier determination information includes a mapping relationship between a position of a frequency domain of a first DC component and a predefined uplink carrier. Determining at least whether the position of the frequency domain of the first DC component is located in uplink carrier of an UL or uplink carrier of a SUL based on the uplink signaling and the carrier determination information includes: determining at least the position of the frequency domain of the first DC component is located in the predefined uplink carrier and the position of the frequency domain of the second DC component is located in an uplink carrier other than the predefined uplink carrier.

Principles, detailed operation and benefits of the tenth specific implementation can be found in the above descriptions of the fourth specific implementation of a method for determining a position of a frequency domain of a DC component shown in FIG. 2, and thus are not described hereinafter.

In an embodiment of the present disclosure, a carrier determination information includes a mapping relationship between a position of a frequency domain of a first DC component and a predefined uplink carrier. With an implicit indication, that is, which one of an UL or a SUL is pre-defined to be used for a first DC component. When a UE reported a position of a frequency domain of one DC component or positions of frequency domains of two DC components, the one or two positions of frequency domains can be correctly received by the base station.

In an eleventh specific implementation of the present disclosure, an uplink signaling further includes a position of a frequency domain of a second DC component, a carrier determination information includes that an UL or a SUL configured with a PUSCH. Determining whether the position of the frequency domain of the first DC component is located in uplink carrier of the UL or uplink carrier of the SUL based on the uplink signaling and the carrier determination information includes: determining at least the position of the frequency domain of the first DC component is located in an uplink carrier currently allowed to transmit data in the PUSCH and the position of the frequency domain of the second DC component is located in an uplink carrier other than the uplink carrier currently allowed to transmit data in the PUSCH.

Principles, detailed operation and benefits of the eleventh specific implementation can be found in the above descriptions of the fifth specific implementation of a method for determining a position of a frequency domain of a DC component shown in FIG. 2, and thus are not described hereinafter.

In an embodiment of the present disclosure, a carrier determination information includes a mapping relationship between a position of a frequency domain of a first DC component and an uplink carrier configured with a PUSCH. With an implicit indication, that is, the position of the frequency domain of the first DC component is pre-defined in an uplink carrier configured with the PUSCH, or in an uplink carrier not configured with the PUSCH, so that when a UE reports a position of a frequency domain of one DC component or positions of frequency domains of two DC components, the one or two positions of frequency domains can be correctly received by the base station.

In a twelfth specific implementation of the present disclosure, an uplink signaling further includes a position of a frequency domain of a second DC component, a carrier determination information includes a mapping relationship between a position of a frequency domain of a first DC component and an uplink carrier configured with a PUCCH. Determining at least whether the position of the frequency domain of the first DC component is located in uplink carrier of an UL or uplink carrier of a SUL based on the uplink signaling and the determination information includes: determining at least the position of the frequency domain of the first DC component is located in an uplink carrier same as the uplink carrier configured with a PUCCH and the position of the frequency domain of the second DC component is located in an uplink carrier other than the uplink carrier configured with the PUCCH.

Principles, detailed operation and benefits of the twelfth specific implementation can be found in the above descriptions of the sixth specific implementation of a method for determining a position of a frequency domain of a DC component shown in FIG. 2, and thus are not described hereinafter.

In an embodiment of the present disclosure, a carrier determination information may include a mapping relationship between a position of a frequency domain of a first DC component and an uplink carrier configured with a PUCCH, with an implicit indication, that is, the position of the frequency domain of the first DC component is pre-defined in an uplink carrier same as an uplink carrier configured with the PUCCH, or the position of the frequency domain of the first DC component is pre-defined in an uplink carrier other than the uplink configured with the PUCCH. When a UE reports a position of a frequency domain of one DC component or positions of frequency domains of two DC components, the one or two positions of frequency domains can be correctly received by the base station.

In an embodiment of the present disclosure, by setting a carrier determination information, a base station at least determines which one uplink carrier between an UL and a SUL a position of a frequency domain of a first DC component is located in based on the carrier determination information and an uplink signaling. In a conventional technology, a base station cannot distinguish from an uplink signaling sent by a UE whether a position of a frequency domain of a DC component reported by the UE is in an UL or SUL (in each BWP), which is liable to lead to errors in determining a DC component. Compared with the conventional technology, the disclosure enable a base station to determine which one uplink carrier between an UL and a SUL a position of a frequency domain of a first DC component is located in, thereby, improving accuracy of receiving a position of a frequency domain of a DC component.

Figure 4:
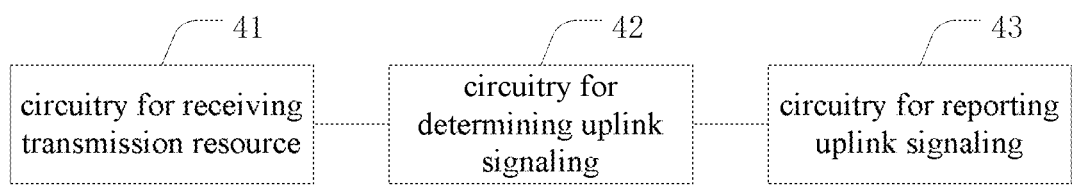
FIG. 4 is a schematic structural diagram of a device for determining a position of a frequency domain of a DC component in an embodiment of the present disclosure.

Referring to FIG. 4, FIG. 4 is a schematic structural diagram of a device for determining a position of a frequency domain of a DC component in an embodiment of the present disclosure. The device for determining a position of a frequency domain of a DC component may be used on a UE, and may include:

A circuitry for receiving transmission resource 41, adapted to receive a transmission resource for an uplink transmission.

A circuitry for determining uplink signaling 42, adapted to determine an uplink signaling of a DC component, wherein the uplink signaling includes a BWP ID and a position of a frequency domain of a first DC component.

A circuitry for reporting uplink signaling 43, adapted to report the uplink signaling in the transmission resource for enabling a base station to determine whether the position of the frequency domain of the first DC component is located in uplink carrier of an UL or uplink carrier of a SUL based on the uplink signaling and a carrier determination information.

Principles, detailed operation and benefits of the device for determining a position of a frequency domain of a DC component can be found in the above descriptions of a method for determining a position of a frequency domain of a DC component shown in FIG. 2, and thus are not described hereinafter.

Figure 5:
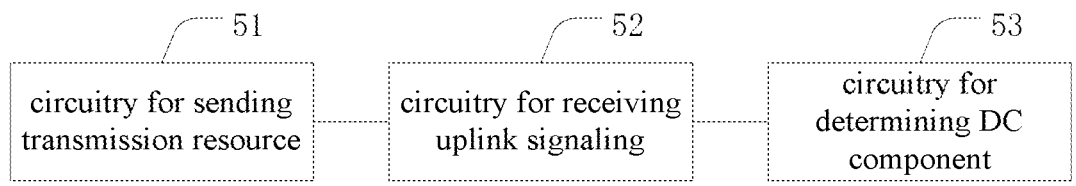
FIG. 5 is a schematic structural diagram of another device for determining a position of a frequency domain of a DC component in an embodiment of the present disclosure.

Referring to FIG. 5, FIG. 5 is a schematic structural diagram of another device for determining a position of a frequency domain of a DC component in an embodiment of the present disclosure. The device for determining a position of a frequency domain of a DC component may be used on a base station, and may include:

A circuitry for sending transmission resource 51, adapted to send a transmission resource for an uplink transmission.

A circuitry for receiving uplink signaling 52, adapted to receive an uplink signaling of a DC component, wherein the uplink signaling comprises a BWP ID and a position of a frequency domain of a first DC component.

A circuitry for determining DC component 53, adapted to determine whether the position of the frequency domain of the first DC component is located in uplink carrier of an UL or uplink carrier of a SUL based on the uplink signaling and a carrier determination information.

Principles, detailed operation and benefits of the device for determining a position of a frequency domain of a DC component can be found in the above descriptions of a method for determining a position of a frequency domain of a DC component shown in FIG. 3, and thus are not described hereinafter.

Embodiments of the present disclosure may be applicable to a 5 Generation (5G) communication systems, 4G or 3G communication systems, and may also be applicable to new various communication systems in future, such as 6G, 7G, etc., which will not be limited in embodiments of the present disclosure.

In the embodiment of the present disclosure, an unidirectional communication link from an access network to a terminal is defined as the downlink, and data transmitted in the downlink is downlink data, and a transmission direction of the downlink data is called as a downlink direction. A unidirectional communication link from the terminal to the access network is defined as the uplink, and data transmitted in the uplink is uplink data, and a transmission direction of the uplink data is called as an uplink direction.

In an embodiment of the present disclosure, a storage medium having computer instructions stored therein is provided, wherein once the computer instructions are executed, the above method for determining a position of a frequency domain of a DC component shown in FIG. 2 or FIG. 3 is performed. The storage medium may be a computer-readable storage medium, for example, the storage medium may include a non-volatile or non-transitory memory, the storage medium may also includes an optical disk, a mechanical hard disk, a solid state drive or the like.

It should also be understood that the memory in embodiments of the present disclosure may be either volatile memory or nonvolatile memory, or may include both volatile and nonvolatile memories. Wherein, the non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM) which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

In an embodiment of the present disclosure, a terminal including a memory and a processor is provided, wherein the memory has computer instructions stored therein, and when the processor executes the computer instructions, the above method for determining a position of a frequency domain of a DC component shown in FIG. 2 is performed. The terminal is the UE, including but not limited to terminal devices such as mobile phones, computers and tablet computers Specifically, in embodiments of the present disclosure, a terminal may refer to various forms of User Equipments (UE), access terminals, user units, user stations, Mobile Stations (MS), remote stations, remote terminals, mobile devices, user terminals, terminal equipments, wireless communication devices, user agents or user devices. The terminal device may also be a cellular phone, a cordless phone, a Session Initiation Protocol (SIP) phone, a Wireless Local Loop (WLL) station, a Personal Digital Assistant (PDA), a handheld device with the wireless communication function, a computing device or other processing devices connected to a wireless modem, vehicle equipments, wearable devices, terminal devices in the future 5G network, terminal devices in the future Public Land Mobile Network (PLMN), and the like, which is not limited in embodiments of the present disclosure.

In embodiments of the present disclosure, the processor may be a Central Processing Unit (CPU), or other general processors, Digital Signal Processors (DSP), Application Specific Integrated Circuits (ASIC), Field Programmable Gate Arrays (FPGA) or other Programmable logic devices, discrete gates or transistor logic devices, discrete hardware components, and the like. A general processor may be a microprocessor or the processor may be any conventional processor or the like.

In an embodiment of the present disclosure, a base station including a memory and a processor is provided, wherein the memory has computer instructions stored therein, and when the processor executes the computer instructions, the above method for determining a position of a frequency domain of a DC component shown in FIG. 3 is performed. The base station includes but is not limited to base station equipment such as base stations, servers, and cloud platforms.

Specifically, in embodiments of the present disclosure, a base station (BS), which may also be referred to as base station equipment, is a device deployed on a Radio Access Network (RAN) to provide wireless communication functions. For example, a device that provides base station functions in a 2G network includes a Base Transceiver Station (base transceiver station, BTS), a device that provides base station functions in a 3G network includes a NodeB (NodeB), a device that provides base station functions in a 4G network includes an evolved NodeB (evolved NodeB, eNB), a device that provides base station functions in a Wireless Local Area Network (wireless local area network, WLAN) is an Access Point (access point, AP), and a device that provides base station functions in a 5G new radio (New Radio, NR) is a gNB and a ng-eNB (ng-eNB). The NR technology is applied for communication between gNB and the terminal, and the E-UTRA (Evolved Universal Terrestrial Radio Access) technology is applied for communication between ng-eNB and the terminal. Both of gNB and ng-eNB can be connected to the 5G core network. The base station in the embodiment of the present disclosure also includes a device that provides base station functions in a new communication system in the future.

Although the present disclosure is disclosed as above, the present disclosure is not limited to this. Those skilled in the art can make various changes and modifications without departing from the spirit and scope of the present disclosure. Therefore, the protection scope of the present disclosure should be subject to the scope defined by the claims.

What is claimed is:

1. A method for determining a position of a frequency domain of a Direct Current (DC) component, comprising:
    receiving a transmission resource for an uplink transmission;
    determining an uplink signaling of the DC component, wherein the uplink signaling comprises a Band Width Part (BWP) ID, a position of a frequency domain of a first DC component, and a position of the frequency domain of a second DC component; and
    reporting the uplink signaling in the transmission resource to a base station;
    wherein the uplink signaling of the DC component further comprises a first Information Element and a second Information Element, the first Information Element is configured to indicate that the position of the frequency domain of the first DC component is located in Uplink (UL) of a serving cell, and the second Information Element is configured to indicate that the position of the frequency domain of the second DC component is located in Supplementary Uplink (SUL) of the serving cell.

2. A device for determining a position of a frequency domain of a Direct Current (DC) component, comprising:
    a circuitry for receiving transmission resource, adapted to receive a transmission resource for an uplink transmission;
    a circuitry for determining uplink signaling, adapted to determine an uplink signaling of the DC component, wherein the uplink signaling comprises a Band Width Part (BWP) ID, a position of a frequency domain of a first DC component, and a position of the frequency domain of a second DC component; and
    a circuitry for reporting uplink signaling, adapted to report the uplink signaling in the transmission resource to a base station;
    wherein the uplink signaling of the DC component further comprises a first Information Element and a second Information Element, the first Information Element is configured to indicate that the position of the frequency domain of the first DC component is located in Uplink (UL) of a serving cell, and the second Information Element is configured to indicate that the position of the frequency domain of the second DC component is located in Supplementary Uplink (SUL) of the serving cell.

3. A non-transitory storage medium storing one or more programs, the one or more programs comprising computer instructions, when executed by a processor, cause the processor to:
    receive a transmission resource for an uplink transmission;
    determine an uplink signaling of a Direct Current (DC) component, wherein the uplink signaling comprises a Band Width Part (BWP) ID, a position of a frequency domain of a first DC component, and a position of the frequency domain of a second DC component; and
    report the uplink signaling in the transmission resource to a base station;
    wherein the uplink signaling of the DC component further comprises a first Information Element and a second Information Element, the first Information Element is configured to indicate that the position of the frequency domain of the first DC component is located in Uplink (UL) of a serving cell, and the second Information Element is configured to indicate that the position of the frequency domain of the second DC component is located in Supplementary Uplink (SUL) of the serving cell.

* * * * *